United States Patent [19]

Hathaway

[11] 4,414,588
[45] Nov. 8, 1983

[54] FLUID BEARING TAPE SCANNING DRUM

[75] Inventor: Richard A. Hathaway, Saratoga, Calif.

[73] Assignee: Ampex Corporation, Redwood City, Calif.

[21] Appl. No.: 139,510

[22] Filed: Apr. 11, 1980

[51] Int. Cl.³ .......................... G11B 5/10; G11B 5/60
[52] U.S. Cl. ..................................... 360/84; 360/129
[58] Field of Search .................. 360/129, 84, 85, 102, 360/103, 107, 130.23, 130.24

[56] References Cited

U.S. PATENT DOCUMENTS

| | | | |
|---|---|---|---|
| 3,840,894 | 10/1974 | Arseneault | 360/84 |
| 3,840,895 | 10/1974 | Kubo | 360/84 |
| 3,911,490 | 10/1975 | Kostin et al. | 360/84 |
| 3,939,493 | 2/1976 | Fowler et al. | 360/84 |

Primary Examiner—John H. Wolff
Attorney, Agent, or Firm—Charles M. Carman, Jr.; Joel D. Talcott

[57] ABSTRACT

A tape scanning assembly including a fixed drum and a coaxially mounted rotating drum defining a gap therebetween, with the tape wrapped in a helical path around the drums and across the gap, the rotating drum being driven to produce a pressurized gas bearing film between the tape and drums, with the bearing film being vented by the gap to tend to produce a variable film thickness gradient on the upstream side of the gap; the assembly is provided with venting means such as relieved portions or grooves on the rotating drum to reduce said gradient and to control the film thickness upstream from the gap.

5 Claims, 4 Drawing Figures

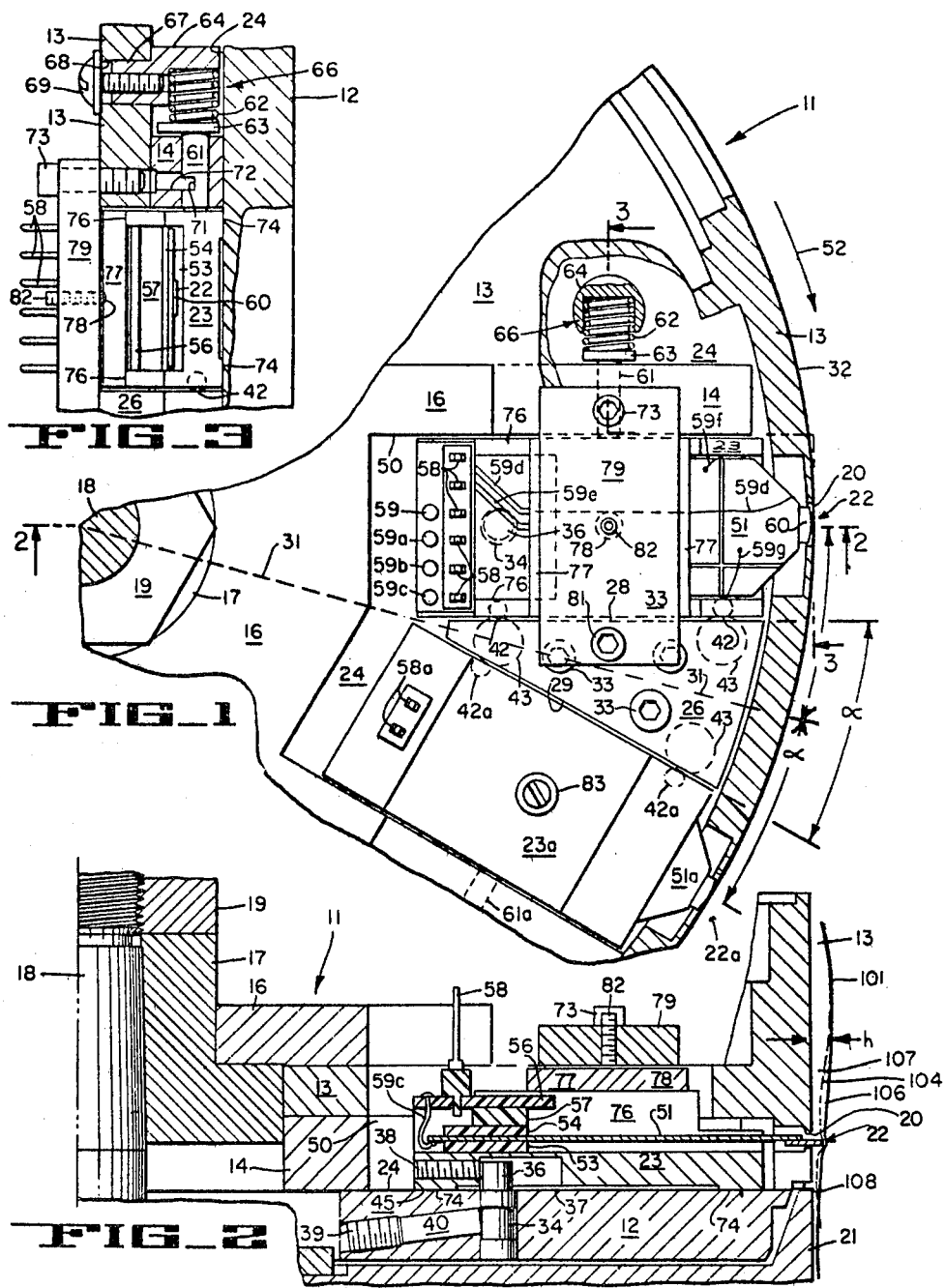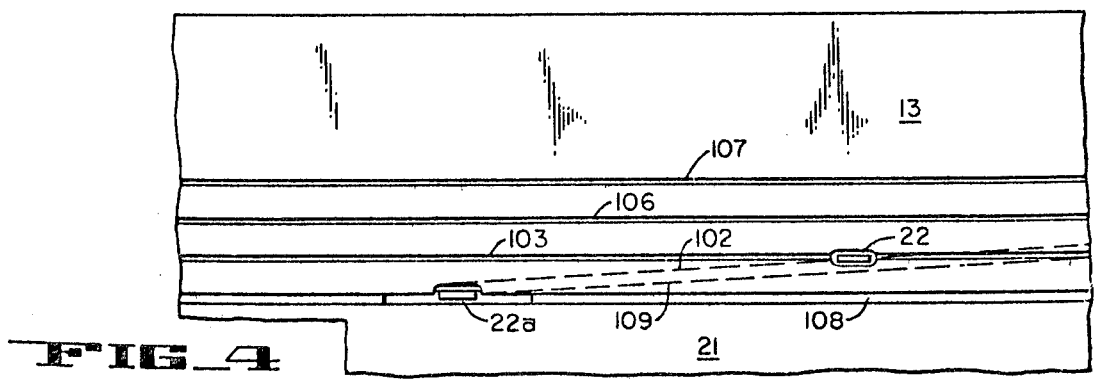

FLUID BEARING TAPE SCANNING DRUM

BACKGROUND OF THE INVENTION

This invention relates to fluid bearings and particularly to such bearings between a magnetic tape and guide drums for helical scanning of said tape.

In U.S. Pat. No. 4,184,183 (Dolby), there is disclosed an arrangement in which a magnetic tape may be helically scanned by two transducing heads concurrently, the heads being mounted in axially-spaced and circumferentially-spaced relation on a rotating scanning drum. The rotating drum is mounted coaxially with respect to a stationary drum of approximately the same diameter and is axially spaced to define a small axial gap between the drums. The tape is wrapped helically around the drums and crosses the gap. A pressurized air film is generated beneath the tape by the rotating drum, and although vented to some degree by the gap, extends nevertheless beneath the tape as it crosses the stationary drum as well. A first of a pair of transducing heads is mounted on the rotating drum at the edge of the gap, and the second head is mounted on a solid (edgeless) portion of the rotating drum, spaced axially and circumferentially from the first head.

It has been found in practice that the venting of the air bearing film by the gap between the drums, together with lateral leakage from beneath the tape edges, causes a substantial decreasing gradient of the bearing film thickness from a maximum thickness over the rotating drum to a much lower thickness over the stationary drum, which decrease in turn appears to cause a variation in both recorded and playback signal strength, as observed by oscilloscope in reproduce mode from a low value at the beginning of the scan of either head, to a higher value which remains substantially uniform over the middle and end portions of the head scan path.

These observations are consistent with capacity probe measurements of the film thickness at various points, and suggests that the gap causes a gradual drop in the film thickness from a maximum dimension just downstream (in the direction of gas flow and drum rotation) from the gas entrance region of the bearing, at the point of tape tangency with the rotating drum.

Such variation of film thickness is of course not desired, for it causes a corresponding variation in the general level of the signal strength, and consequently a variation in the quality of recording and replay.

It is therefore an object of the present invention to provide means for controlling the thickness of a pressurized bearing film between a tape and a pair of coaxially-mounted guides having differential rotation with respect to one another.

BRIEF DESCRIPTION OF THE INVENTION

This and other objects are attained by a tape scanning assembly including a fixed drum and a coaxially mounted rotating drum defining a gap therebetween, with the tape wrapped in a helical path around the drums and across the gap, the rotating drum being driven to produce a pressurized gas bearing film between the tape and drums with the bearing film being vented by the gap, to tend to produce a variable film thickness gradient on the upstream side of the gap; the assembly is provided with venting means such as relieved portions or grooves on the rotating drum to reduce said gradient and to equalize the film thickness upstream from the gap.

DESCRIPTION OF THE DRAWINGS

FIG. 1 is a fragmentary plan view of a portion of a rotating head drum with two heads mounted thereon;

FIG. 2 is a cross-sectional elevation view of the assembly of FIG. 1, taken on the plane 2—2 of FIG. 1;

FIG. 3 is a cross-sectional and elevation view of the assembly of FIG. 1, taken on the planes 3—3 of FIG. 1, and showing a tape applied thereto;

FIG. 4 is a fragmentary cross-sectional elevation view of a portion of the apparatus shown in FIGS. 1 and 2, taken from the right-hand side of FIG. 2, and omitting the tape shown in FIG. 2.

DESCRIPTION OF THE PREFERRED EMBODIMENTS

Referring now to FIGS. 1–4, the present invention lies in various combinations of grooves 103, 106 and 107 with portions of the structure shown in the above-referenced U.S. Pat. No. 4,184,183. Consequently, the structure of U.S. Pat. No. 4,184,183 is shown in FIGS. 1–4 and is re-described in brief below as a necessary preliminary to description of the structure and function of grooves 103, 106 and 107 in combination therewith.

STRUCTURE OF U.S. PAT. NO. 4,184,183

Referring now to FIGS. 1 and 2, there is shown a rotating head drum 11 comprising a lower circular base plate 12 and a cylindrical upper drum member 13, which is bolted or otherwise firmly attached to the base plate 12. A spacing spider 14 is disposed between the elements 12, 13 and in here shown as epoxy-glued to the drum 13, serves to mount the drum on a flanged sleeve 17, which is fitted on a tapered drive shaft 18 and retained thereon by a nut 19. On this basic structure it is desired to mount a pair of magnetic transducing heads 22 and 22a, mounted in windows 20 of the drum 13, and as will later be described in greater detail, in a pair of modular mounting shoes 23 and 23a, respectively.

As first steps toward providing a field replaceable precision mounting characteristic for the heads 22, 22a, there are provided on the drum a set of gauge surfaces, including the upper surface 24 of the base plate 12, which is needed for accuracy of location of the heads in an axial direction of the drum. For accuracy of location in a circumferential direction, there is provided a wedge element 26, which has a precision-lapped under-surface engaging the reference surface 24, and a pair of gauge reference surfaces 28 and 29, each precisely the angle alpha that has been chosen for the angular spacing between the two heads 22, 22a. In order to make the surfaces 28, 29 properly available for locating the two heads 22, 23, the wedge element 26 is carefully positioned on the reference surface 24 so that the plane 31 bisecting the angle alpha between surfaces 28, 29 passes precisely through the geometric axis of the cylinder defined by the outer surface 32 of the drum 13.

For radial positioning of the shoe 23, for example, base plate 12 has an eccentric pin 34 rotationally mounted therein with the eccentric portion 36 of the pin projecting upwardly into a recess 37 in the shoe (FIG. 2). Engaging the eccentric portion 36, on its most radially-inward side, is the tip of a precision set-screw 38. The positions of both pin 36 and screw 38 are established at the factory and, once these positions are established, the screws are locked in place by means of locking set screw 39 (which operates through a brass slug 40) and screw 41, respectively, thus permanently and precisely establishing the radial position of the head 22 even when it is a replacement inserted in the field.

It will be noted that the shoes 23, 23a in FIG. 1 each engage the wedge element 26 through a pair of small bearing spheres 42. As for the mating gauge surfaces of the wedge element 26, they are supplied by means of tungsten carbide dowel inserts 43, which are cemented into conforming holes in the wedge element, and then ground off to form a common flat surface with the side of the wedge element, against which the spheres 42 may bear.

It will be noted that the shoe 23 presents an upward facing leaf element 51 which constitutes the most proximal part of the mounting for head 22, but that the shoe 23a is turned bottom-up, with its head 22a mounted at the end of a leaf element 51a which protrudes from beneath the body of the shoe.

As shown in FIGS. 1 and 2, the leaf 51 is mounted at the base end upon the shoe 23, between insulating members 53 and 54, and an insulating rack or circuit board 56 is superimposed upon a spacer member 57; upon the rack 56 mounted electrical coupling jacks 58, which are electrically connected to the various electrode surfaces of the bimorph leaf through leads 59, 59a, 59b and 59c and to the winding of head 22 through leads 59d and 59e. The leads 59f, 59g also shown are for the purpose of connecting the inboard upper main electrode with the outboard under electrode, and the outboard upper electrode with the inboard under electrode for producing an S-bend, as described more fully in the U.S. Pat. No. 4,099,211.

The shoe 23, with its head 22 and bimorphic leaf 51 is, when mounted, held in pressurized contact with the wedge element 26 as by means of a spring loaded pressure member 61 (FIGS. 1 and 3) in the form of a pin slidable in a conforming hole in a portion of spider 14 so as to engage the side of shoe 23 opposite the wedge element. A compression spring 62 urges the member 61 toward the shoe; the spring bearing against a flange 63 at the base of the pin portion of member 61. The spring 62 is held in a hod-like carrier 64 having a spring retaining bore 66 formed therein; although the bore 66 is open at the bottom, the spring is prevented from escaping by the adjacent surface 24 of base plate 12. The carrier 64 has an upwardly extending stud portion 67 fitting into a conforming bore 68 in the web of drum member 13, and a screw and washer assembly 69, threaded into the upper end of stud portion 67, retains the holder and spring. For retracting the pressure member 61, as for freeing the shoe 23 for removal, or when a new shoe is to be inserted, the pin portion of the member 61 has a transverse slot 71 formed in the upper portion, into which a suitable tool, such as an eccentric pin tool, may be inserted. The slot 71 is kept upright by a flattened lower side of flange 63 bearing on surface 24. A bore 72 is provided in member 14 for access of the eccentric tool, the bore 72 extending upwardly through member 13 as well, and serving also as a threaded bore for a retaining bolt 73 presently to be described.

On the bottom surface of shoe 23 are formed four corner feet 74, the bottom surfaces of which are lapped to the same plane, and rest on the gauge surface 24 of base plate 12. The shoe is further provided with a pair of side shoulders 76 extending vertically higher than any other parts of the shoe, and across the shoulders 76 is placed a clamping block 77, which has a counter-sunk depression 78 in the center of the upper face. Across the clamping block 77 is laid a clamping bridge 79, bolted down at the ends to adjacent portions of drum 13 and wedge member 26 as by means of bolts 73 and 81, respectively, the bolt 73 being threaded into the upper extension of bore 72 as previously mentioned. A set screw 82 is sufficiently tightened, it loads the members 77, 79 as leaf springs and clamps to shoe 23 firmly in position.

It was previously mentioned that shoe 23a is mounted in an upside-down relationship on gauge surface 24 of base plate 12. Furthermore, as will be further explained below, the leaf member 51a is not a displaceable bimorph leaf as is the leaf 51 of shoe 23. Consequently there is no need to bridge the shoe for clamping it to the base plate; instead a single bolt and washer combination 83 is used, the bolt 83 passing through enlarged bores 84 and 86 in the shoe 23a and the leaf member 51a, respectively, which permit lateral adjustment of the shoe position prior to clamping down with the bolt 83.

THE PRESENT INVENTION COMPRISING GROOVES IN THE DRUM

Referring again to FIG. 2 the tape 101 is shown in relation to the drums 13, 21, as supported on an air bearing of thickness h, which dimension is exaggerated in the Figure for clarity of illustration; the dimension h actually varies from a value of about 1.5 mils at the thickest portion, near the arrows relating to the reference letter h, to a value of about 0.5 mil over the lower stationary drum 21.

In order to decrease the thickness h in the vicinity of head 22, and to render this thickness substantially uniform throughout the length of the scan track 102 of this head (see FIG. 4) the present invention comprises a relieved area in the vicinity of the transverse plane of drum 13 at the level of head 22, and particularly this relieved area includes a circumferentially directed groove 103, having two ends lying on circumferentially opposite sides of head 22 and terminating at and communicating with the opening 20 of drum 13 through which head 22 projects.

It has been found in practice that such a groove operates to vent the thicker portion of the air bearing and to bring the tape closer to the drums, as illustrated by the dashed line 104 in FIG. 2.

It has also been found advantageous to provide one or more further circumferential grooves, such as grooves 106, 107, parallel to groove 103 and on either side thereof, although both grooves 106, 107, as shown, lie on the side of groove 103 remote from the gap 108 that exists between the drums.

As for head 22a, which follows a scan track 109 on tape (FIG. 4) the provision of the grooves 103, 106 and 107 also renders the reproduced signal strength of this head more uniform throughout that portion of the scan track for which the head is active in reproduction.

A favorable groove shape and dimension has been found to be that of an isosceles right triangle with the hypotenuse thereof, representing the groove width of dimension about five to thirty times the desired bearing film thickness, and lying coincident with the drum surface, and the apex thereof representing the deepest portion of the groove.

It has been found that the grooved area cannot be extended too far away from the gap toward the transverse midplane of the rotating drum, without substantially increasing the power required to keep the drum in rotational synchronization, due to increased frictional drag and braking effect on the tape.

The precise number, configuration and positioning of the grooves has been found to be sensitively related to the actual structural and operational parameters of the machine to which they are to be applied.

In summary, there has been described a tape scanning assembly including a fixed drum and a coaxially mounted rotating drum defining a gap therebetween, with the tape wrapped in a helical path around the drums, with the bearing film being vented by the gap to tend to produce a variable film thickness gradient on the upstream side of the gap; the assembly is provided with venting means such as relieved portions or grooves on the rotating drum to reduce said gradient and to control the film thickness upstream from the gap.

I claim:

1. A helical scan magnetic tape transport comprising coaxially mounted fixed and rotating drums having an axial gap therebetween and at least one magnetic transducing head mounted on said rotating drum remote from said gap, together with means for moving said tape in a helical path around said drums and across said gap and for driving said rotating drum to produce a pressurized gas bearing film between said tape and drums, characterized in that:
said rotating drum is provided with means in the vicinity of the transverse plane of said head normal to the drum axis for controllably venting said gas bearing film so as to reduce the film thickness at said head plane to a desired dimension that is uniform along the length of the scan of said head in said plane.

2. A magnetic tape transport as described in claim 1, wherein:
said rotating drum is (provided with a circumferentially directed) relieved to define a circumferential groove in said transverse plane of said head.

3. A magnetic tape transport as described in claim 2, wherein:
said rotating drum is provided with a second circumferential groove parallel to said first-named groove, and spaced therefrom on the side thereof remote from said gap.

4. A magnetic tape transport as described in claim 3, wherein:
said rotating drum is provided with a number of other circumferential grooves parallel to said first-named and second grooves at various axial positions in the vicinity of said head.

5. A magnetic tape transport as described in claim 4, wherein:
said grooves are of substantially right-angular V-shape in cross-section and have widths substantially in the range of from five to thirty times the nominal gas bearing film thickness adjacent to said gap.

* * * * *

UNITED STATES PATENT AND TRADEMARK OFFICE
CERTIFICATE OF CORRECTION

PATENT NO. : 4,414,533

DATED : November 8, 1983

INVENTOR(S) : Richard A. Hathaway

It is certified that error appears in the above-identified patent and that said Letters Patent are hereby corrected as shown below:

Column 1, line 44, change "lownstream" to "downstream",

Column 6, Lines 7, 8, delete the parenthetical phrase: "(provided with a circumferentially directed)".

Signed and Sealed this

Seventh Day of May 1985

[SEAL]

Attest:

DONALD J. QUIGG

Attesting Officer    Acting Commissioner of Patents and Trademarks